No. 824,400. PATENTED JUNE 26, 1906.
R. D. BAKER.
VEHICLE BRAKE.
APPLICATION FILED MAY 1, 1905.
4 SHEETS—SHEET 1.
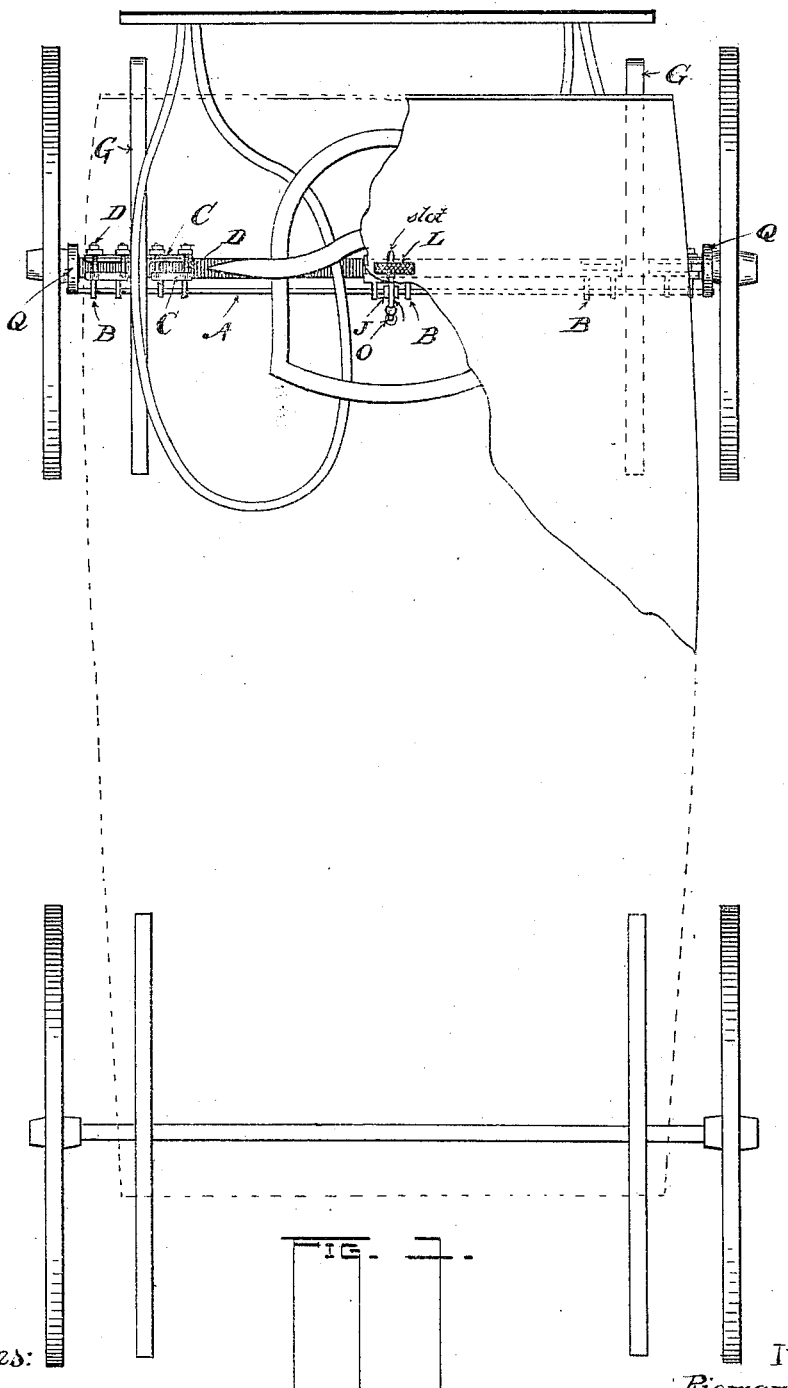
Witnesses:
Inventor
Rieman D. Baker,
By L. N. Thurlow,
Atty.

No. 824,400. PATENTED JUNE 26, 1906.
R. D. BAKER.
VEHICLE BRAKE.
APPLICATION FILED MAY 1, 1905.
4 SHEETS—SHEET 2.
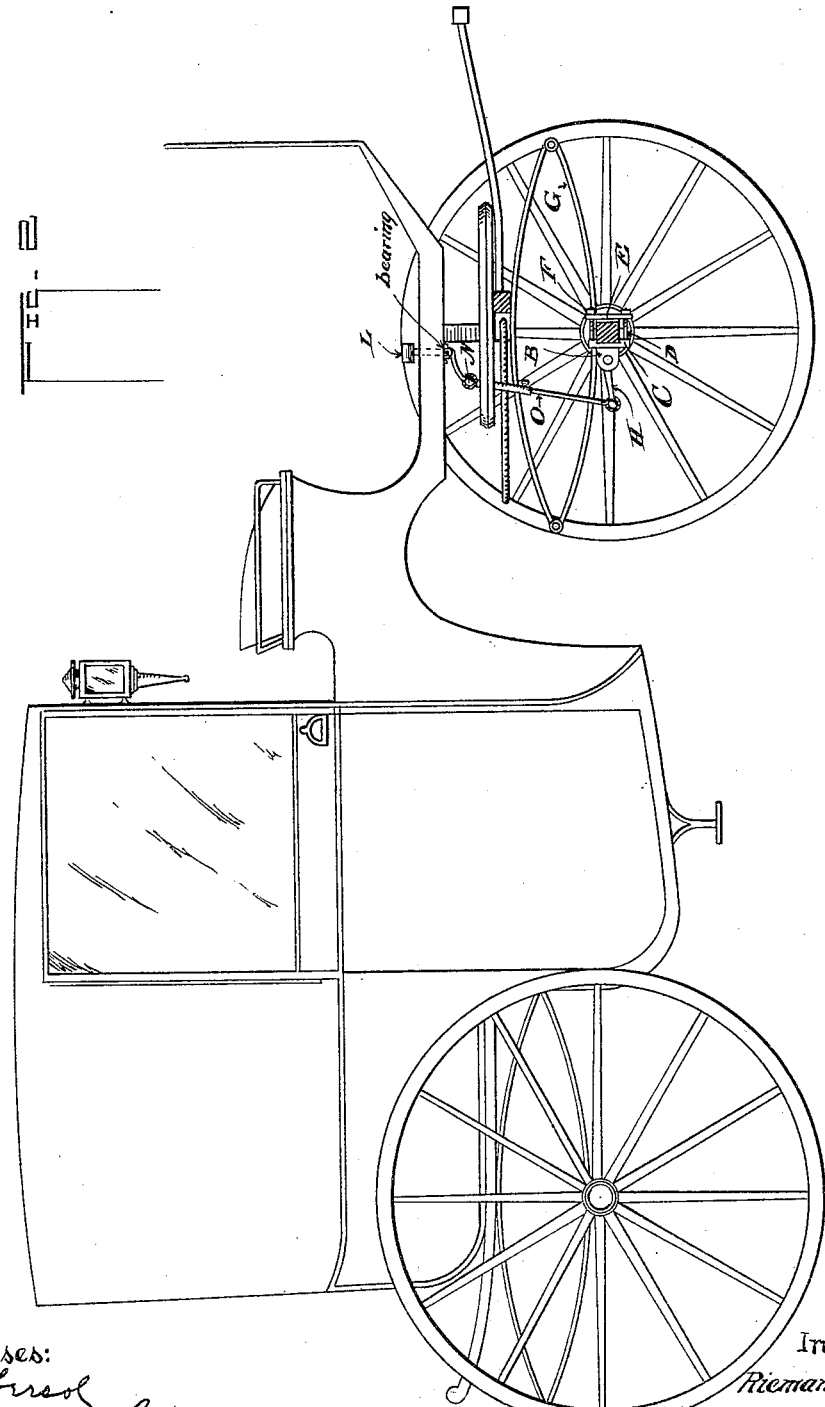
Witnesses:
Inventor
Rienam D. Baker
By L. N. Thurlow,
Atty.

No. 824,400. PATENTED JUNE 26, 1906.
R. D. BAKER.
VEHICLE BRAKE.
APPLICATION FILED MAY 1, 1905.
4 SHEETS—SHEET 3.
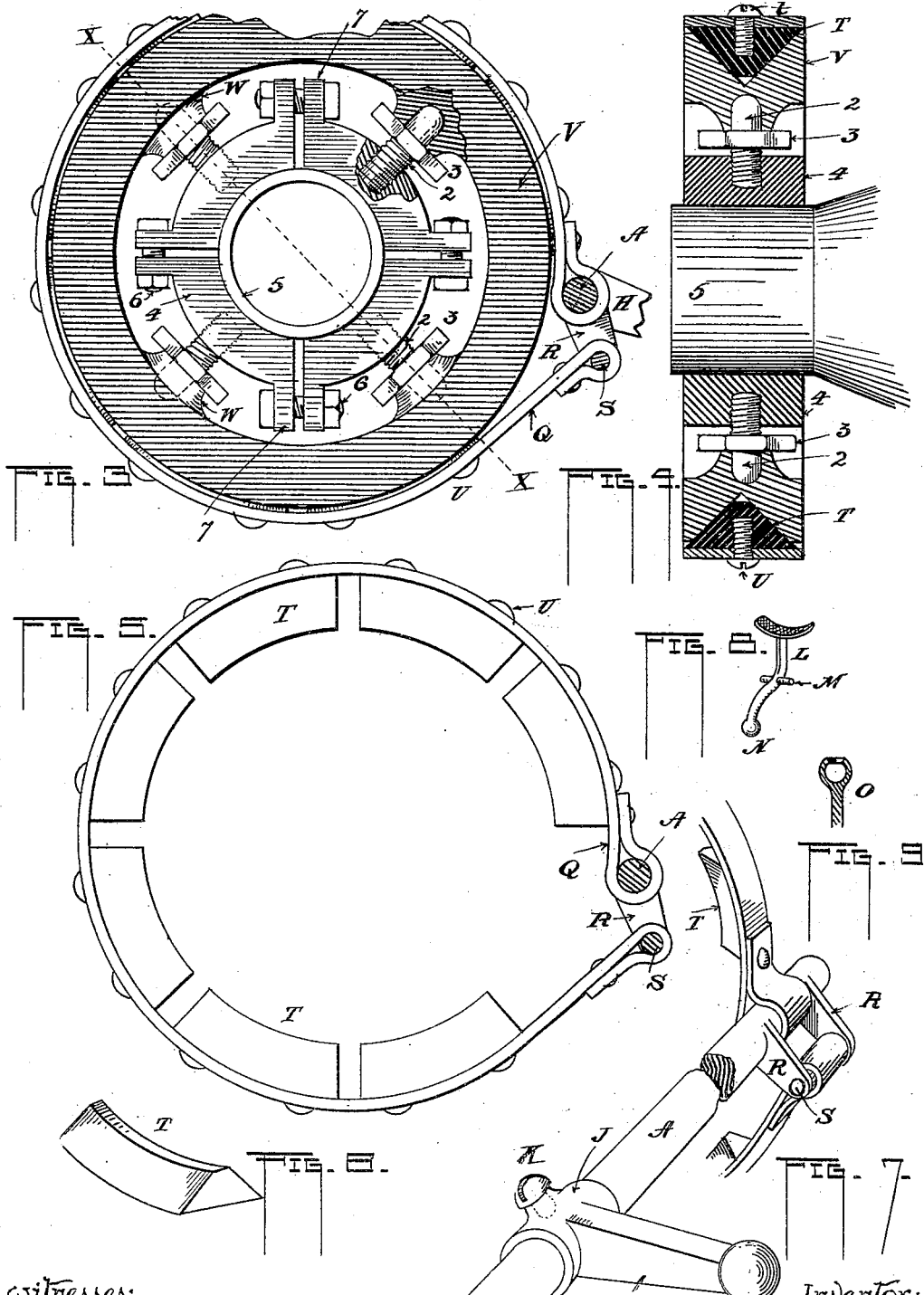
Witnesses:
Inventor:
Rieman D. Baker,
By L. M. Thurlow,
Atty.

No. 824,400. PATENTED JUNE 26, 1906.
R. D. BAKER.
VEHICLE BRAKE.
APPLICATION FILED MAY 1, 1905.
4 SHEETS—SHEET 4.
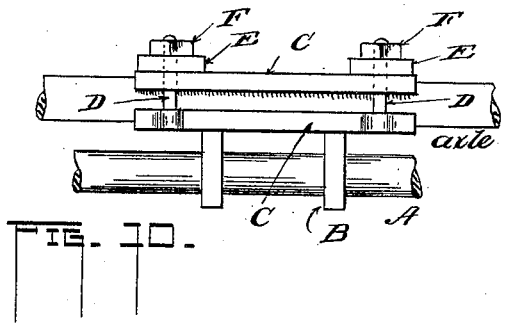
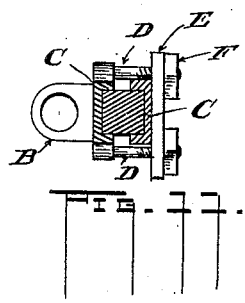
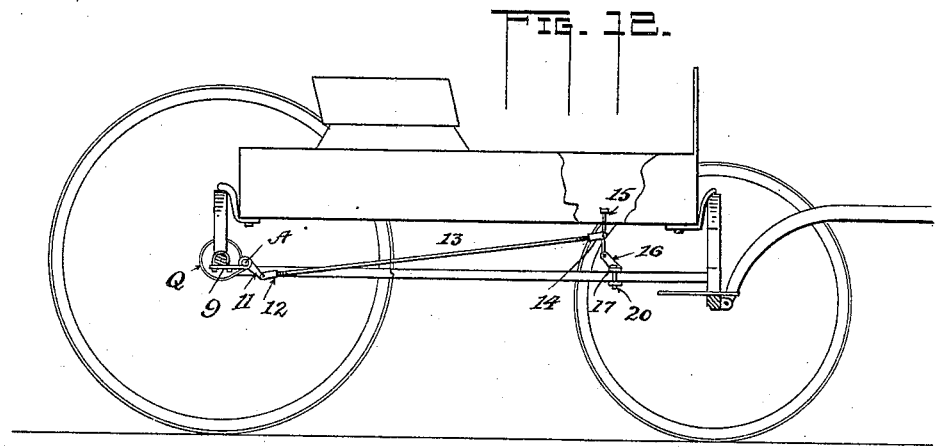
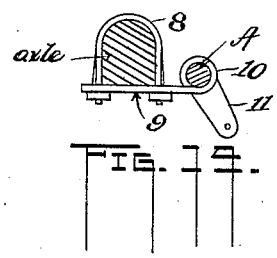
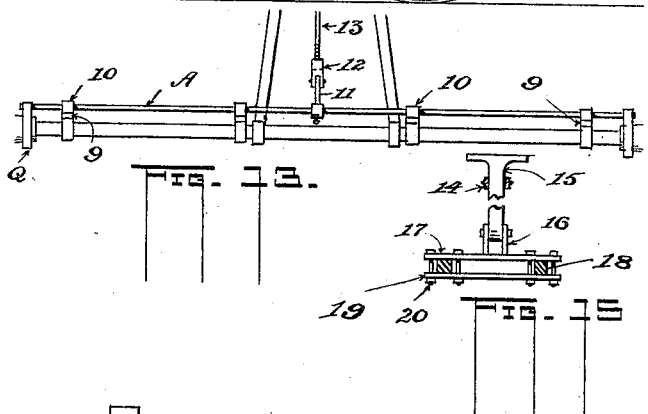
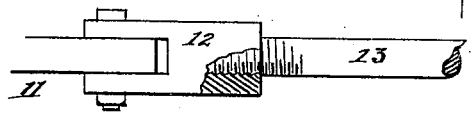
Witnesses:
Inventor:
Rieman D. Baker,
By L. N. Thurlow,
Atty.

UNITED STATES PATENT OFFICE.

RIEMAN D. BAKER, OF PEORIA, ILLINOIS, ASSIGNOR OF ONE-HALF TO HARRY W. WOODMANSEE, OF PEORIA, ILLINOIS.

VEHICLE-BRAKE.

No. 824,400.  Specification of Letters Patent.  Patented June 26, 1906.

Application filed May 1, 1905. Serial No. 258,194.

*To all whom it may concern:*

Be it known that I, RIEMAN D. BAKER, a citizen of the United States, residing at Peoria, in the county of Peoria and State of Illinois, have invented certain new and useful Improvements in Vehicle-Brakes; and I do hereby declare that the following is a full, clear, and exact description of the invention, which will enable others skilled in the art to which it appertains to make and use the same.

This invention pertains to improvements in brakes for vehicles.

The object of the invention is to provide a brake for light buggies or heavy carriages in which a friction-drum and friction-band of peculiar form are employed.

A further object is to employ a drum adapted to be clamped to the hub of the wheels, said drum being of peculiar form.

A further and important object is to provide a peculiar form of brake mechanism to be carried on the front axle of the vehicle and operated by a foot-lever at the driver's seat.

The invention also relates to certain detail of construction, as will be described in the following specification.

In the appended drawings, forming part of this application, Figure 1 is a top view of the gearing of a brougham, showing my improved brake attached to the rear side of the front axle. Fig. 2 is an elevation of a brougham, showing my brake, the front axle being in section to better show the construction. Fig. 3 is a side view of a brake-drum and its inclosing band. Fig. 4 is a cross-section of the same on line X X, Fig. 3, showing the hub on which it is mounted. Fig. 5 is a side view of the friction-band removed from the drum. Fig. 6 is a perspective view of a friction member removed from the friction-band. Fig. 7 is a perspective view of a rock-shaft rod, showing at one end the terminals of the band shown in Fig. 5. Fig. 8 is a perspective view of a foot-lever used for operating the brake. Fig. 9 is a sectional view of a portion of a socket arm or rod shown in Fig. 2. Fig. 10 is a top view of a portion of an axle, showing two members clamped thereto, one of which carries the rod illustrated in Fig. 7. Fig. 11 is an end view of the same in part section. Fig. 12 is an elevation of a light form of vehicle, showing my brake attached to the rear axle. Fig. 13 is a top view of a portion of the gearing of the vehicle shown in Fig. 12, showing the brake carried on the axle. Fig. 14 is a transverse section of an axle, showing the manner of carrying the brake thereon. Fig. 15 is a transverse section of the reaches shown in Fig. 13, showing means for pivoting a foot-lever thereon. Fig. 16 is a top viw of a coupling member shown in Fig. 12, which will be described.

My device in one of its forms comprises a rod lying parallel with and extending the full length of the axle between the wheels, said rod being indicated by A in Fig. 1 at the rear of the front axle. It is carried in ears B B of clip members secured to said axle, said members, as shown in Figs. 10 and 11, consisting of the plates C C, one at the front and one at the rear of the axle, there being threaded members D in one of the plates to pass over the opposite plate C through a tie-plate E, where they are provided with nuts F. Preferably I locate one of these clip members each side of the springs G and one in the middle of the axle, thereby giving firm support and rigidity to said rod A. Between the lugs B B of the middle member referred to a rearwardly-projecting arm H is secured to the rod A by means of its sleeve J and screw K or other good means permitting adjustment of said arm about the rod. In Fig. 8 is shown a foot-lever provided with the trunnions M M, which, as shown in Fig. 2, have a bearing beneath the driver's platform, while the lower extremity of the lever is provided with a ball N. The lever just described and the arm H are now connected by means of a telescoping rod O, each end having a socket for receiving the balls of the members it connects. It is to be noted that the entire connection is just behind the pivot on which the axle turns, so that but little motion takes place even in the extremes of movement of said axle. It is further to be noted that by providing the ball-and-socket joint above and below any and all movements are permitted. However, I may not use the ball-and-socket joint at both of the places described, since by merely having one of such joints at either one of the places described the same results will obtain.

To my knowledge a construction in brakes the equivalent of that just described has not been produced. The simplicity of this construction and its short connection makes it low in cost, rigid, strong, and effective in its results. I am aware, however, of two or three brakes that have been applied to the front wheels with mechanism within the vehicle for operating them; but the construction I employ is much more simple and is applied in an entirely different manner.

As before mentioned, the rod A extends from wheel to wheel and carries a friction-band Q at each end, all of which is clearly shown in Figs. 3, 5, and 7. In the latter figure one end of the band Q is bent around the rod A and riveted, and at each side of said band is an arm R. The opposite looped end of the said band Q lies between these arms, and a pin S passes through both arms and the loop, as shown. It will be seen that a rocking movement of the rod in the proper direction will shorten the band and reduce its circumference. In Fig. 5 the inner surface of the band is shown provided with a series of short members T, one of which is shown detached in Fig. 6, being of triangular form in cross-section and formed, preferably, from hard fiber which will give a good friction-surface and withstand wear. These sections or members T are secured to the band Q by means of screws U, Fig. 4, or other means that will hold them firmly and secured in position.

I provide a drum (shown at V) which consists of a ring having a V-shaped groove in its periphery of the same form as the members T described, the latter fitting snugly therein. At several points on the inner periphery of the ring are lugs or bosses W, extending toward the center of the ring. These said bosses are bored out to receive the end of a thread-bar 2, the latter being provided with a rounded end to seat in the bores so provided. Said thread-bars are provided with threads, as shown, and also a member 3 in the form of a nut, by which the said thread-bars may be turned, as desired. At 4 4 4 4 are shown members each in the form of a quarter-circle, their inner surfaces being formed to fit the hub of a wheel, said hub being illustrated at 5. The thread-bars described are screwed into the members 4, and the adjacent ends of all the said members are connected by means of bolts 6 passing through lugs 7 on said adjacent ends, as shown. While I have shown the thread-bars as merely socketed in the ring V, they may be threaded in. However, it is to be noted that by turning the thread-bars by means of a wrench the members 4 will be moved toward or away from the hub, according to the direction of movement imparted to the former, thereby obtaining any adjustment for any size of hub to which the drum is to be secured. Before adjustment of the thread-bars 2 the bolts 6 are loosened, thereby giving the members 4 free movement, these again being tightened after the desired adjustment has been had. It will be understood that by the use of the bolts 6 an exceeding stiff and firm job results.

In Fig. 12, where the braking device is used on the rear axle, the same construction is used for the friction devices. The only change is in the manner of mounting the rod A forward of the axle and the manner of connecting the said rod with the foot-lever. In mounting the rod the usual tie members on the clips 8 are removed and replaced by a member 9, having a loop 10 formed in its forward end, adapted to receive said rod. At the middle of the latter an arm 11 corresponds to the arm H in Fig. 7. To this arm 11 is pivoted a bifurcated internally-threaded member 12, into which screws a rod 13 of some length, extending forward and again screwed into a similar member 14, pivoted to the foot-lever 15. The latter is pivoted at its lower end between ears 16, formed with or secured to a plate 17, secured across the reaches 18 of the vehicle, there being a corresponding plate 19 below the reaches, held firmly by bolts 20. The arrangement is such that a forward movement of the foot-lever on its fulcrum between the arms 16 will pull the rod 13 forward, thus raising the arm 11 of the rod A to tighten the band upon its drum. In the form of leverage shown in Fig. 2 a forward movement of the foot-lever will raise the rod O and the lever or arm H to acquire the same result as described.

The V-shaped groove in the drum V, together with the friction members T, by reason of presenting a large friction-surface, constitute a brake of great service on heavy vehicles, such as carriages, where heretofore brakes have not been employed because of their form. My brake can be placed on the finest carriage without marring it or presenting an ugly appearance, it being almost unnoticeable. By reason of its simple form it can be used on the front axle, and because it can be used on both wheels it is of value, since if placed on one wheel only it would cause a jerky motion, which would be transmitted to the horses through the tongue. The band Q being of spring-steel will be flexible by reason of the spaces between the members T and will naturally release itself from the drum when the rod A is permitted to turn by releasing the foot-lever. The rod O in Fig. 2 is adjustable, so that all lost motion may be taken up, while the members 12 and 14 and the rod 13 in Fig. 12 are for the same purpose.

As a matter of fact, I do not wish to confine myself too closely to the particular structure shown, as slight changes may be made that will still come within the scope of my invention.

I claim—

1. A vehicle-brake comprising braking devices on the wheel-hubs, a lever positioned substantially midway between the hubs for operating said braking devices and with which it is indirectly connected, a foot-lever located in the vehicle above the first said lever, and a rigid rod connecting the levers, its ends connected directly thereto, there being universal connections between the rod ends and the levers for permitting universal movement, the rod occupying a substantially vertical position at all times, the lower end of the rod moving in the arc of a circle with the lower lever by the swinging of the axle on which the said lower lever is carried, the upper end of the rod occupying a fixed position relative to its lower end and the axle.

2. A vehicle-brake comprising braking devices for the wheels, a lever positioned substantially midway of the length of the axle and indirectly connected with the said braking devices, said lever projecting rearward substantially in a horizontal direction, and adapted by a raising movement to set the brakes, the end of the lever describing the arc of a circle by the swinging of the axle on which it is carried, a rigid rod connected to the rear end of the lever by a connection allowing free movement of the two relatively in any direction, a foot-lever in the vehicle above the first-described lever, the rod having direct connection with said foot-lever also by a loose joint substantially as shown, the rod at its lower end following the movements of the lever on the axle, and the upper end of said rod remaining stationary relative to the said lower end but adapted to turn on the foot-lever.

3. The combination with the front axle of a vehicle, of braking means for the wheels thereof, a lever carried on the axle and having indirect connection with the said braking means, its end projecting rearward of the axle, a foot-lever in the vehicle above the axle, a rod positively connecting each lever, there being a universal connection between said rod and the levers, substantially as shown, the lever on the axle describing an arc of a circle when swinging with the axle, the lower end of the rod being carried therewith, the upper end remaining stationary relative to the said swinging lower end, there being means for adjusting the rod for length for the purposes indicated.

4. In a vehicle-brake, the combination of the front wheels of the vehicle, means for engaging the said wheels for braking purposes, a lever for operating the said means, said lever stationed substantially midway between the wheels and extending rearward in substantially a horizontal direction, a foot-lever within the vehicle adapted to pivot in a vertical plane and having an extension below and rearward of its pivot, a rigid rod adjustable for length, one end having a swivel connection with the foot-lever extension and adapted only for vertical movement with the said foot-lever except a swiveling one, the opposite end of the rod having swiveled connection with the horizontal rearwardly-extending lever to swing in a horizontal plane with such lever in the arc of a circle, said rod being entirely free of restraining means between its engaged ends.

5. The combination of the axle and front wheels of a vehicle, a braking device for engaging each wheel, a member connecting each said braking device, a lever on the member for operating both devices, a foot-lever in the vehicle, a member directly connected to each lever in a positive manner for connecting such levers, the connected end of the lever within the vehicle being located above the connected end of the lever on the axle substantially as shown, the connections between the levers consisting of ball-and-socket joints permitting free universal movement of said levers and the member as the latter follows the movements of the lever due to the horizontal swing of the axle on its pivot.

6. In a friction-brake of the character described, friction-drums on the front wheels of the vehicle, a rock-shaft extending from hub to hub, a friction-band carried at each end of the shaft for engaging the drums, an arm on the shaft at substantially the middle of the length thereof, a foot-lever within reach of the driver, the lever and arm being located at substantially the point of pivotal connection between the front axle and vehicle-body and an adjustable rigid connection between the arm and lever, there being a ball-and-socket connection between the connection, the arm, and the lever for the purposes described.

7. In a friction-brake, a friction member adapted to be clamped upon the hub of the ground-wheel, a friction-band for gripping the same, clamping members by which the friction member is carried, means between the said clamping member and friction member for adjusting the former upon the hub and other means for clamping the several said members together and to the said hub.

8. In a friction-brake, a friction-ring, a band for engaging its outer surface, a series of clamping members within said ring, means between the members and the ring for adjusting the former for the purposes explained, and means for clamping the several members upon the wheel-hub after adjustment.

9. In a friction-brake, a friction member having a groove in its periphery, a flexible band, a series of fiber members carried by the band for frictionally engaging the groove, a series of separately-adjustable members within the friction member, means for adjusting the members toward the hub, and other means on the adjustable members for clamping all of them upon the hub to sustain the friction member in fixed position.

10. In a friction-brake, an annular friction member, a flexible band surrounding it, a series of fiber members affixed to the band for engaging the friction member, a series of clamping members within the said friction member, threaded members engaging each member and socketed in the friction member, a turn of said threaded member moving the clamping member only and bolts connecting the adjacent ends of the several clamping members for drawing them together upon the wheel-hub substantially as described.

11. In a brake of the character described, a friction-drum consisting of a ring having a V-shaped groove in its outer periphery, adjustable clamping means for firmly securing the ring to the hub of a wheel, comprising a series of adjusting-screws, a member for each screw adjustable by the latter toward or away from the wheel-hub, devices for connecting all the said members after they are clamped upon the hub, and a friction-band for engaging the V-shaped groove of the drum.

12. In a friction-brake, an annular member having a friction-surface and a friction-band therefor, devices within the member for engaging the wheel-hub, and means between the member and the devices for adjusting the latter toward or away from the hub.

13. In a friction-brake, an annular member having a friction-surface and a friction-band therefor, devices within the member for clamping the wheel-hub, means between the member and the device for adjusting the latter to the hub, and means for clamping the several devices as a unit after being adjusted to the hub.

14. A brake consisting of clamping members for grasping the hub of a wheel, an annular member carried thereby, devices between the clamping members and the annular member for adjusting the former to and from the hub, the clamping members and the annular member being rigid relatively when clamped to the hub, and a friction-band for engaging the said annular member.

15. In a vehicle-brake the combination of the front wheel and axle, friction-bands for the wheel-hubs, a rod for connecting and operating the bands, a foot-lever in the vehicle, and a connection between the lever and the friction-band-operating rod, there being a ball-and-socket connection for the same for permitting universal movement for the purposes stated.

16. In a vehicle-brake, the combination of the front wheels and axle, a friction member secured to the hub of each wheel, a friction-band surrounding the member and adapted to frictionally engage the same, a rod connecting both bands for operating them simultaneously, a foot-lever within the vehicle, a ball on the end thereof, a substantially vertical rod having a socket at one end for inclosing the ball, the opposite end of the rod having indirect connection with the rod that operates the brake-bands.

In testimony whereof I affix my signature in presence of two witnesses.

RIEMAN D. BAKER.

Witnesses:
L. M. THURLOW,
A. KEITHLEY.